United States Patent
Park et al.

(10) Patent No.: US 8,697,293 B2
(45) Date of Patent: Apr. 15, 2014

(54) NON-AQUEOUS ELECTROLYTE SOLUTION FOR LITHIUM SECONDARY BATTERY AND LITHIUM SECONDARY BATTERY HAVING THE SAME

(75) Inventors: So-Young Park, Gyeonggi-do (KR); Hee-Gyoung Kang, Chungcheongnam-do (KR); Joon-Sung Bae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 602 days.

(21) Appl. No.: 12/989,360

(22) PCT Filed: Apr. 24, 2009

(86) PCT No.: PCT/KR2009/002167
§ 371 (c)(1),
(2), (4) Date: Jan. 7, 2011

(87) PCT Pub. No.: WO2009/131419
PCT Pub. Date: Oct. 29, 2009

(65) Prior Publication Data
US 2011/0111306 A1   May 12, 2011

(30) Foreign Application Priority Data

Apr. 25, 2008  (KR) .................. 10-2008-0038767

(51) Int. Cl.
*H01M 6/16* (2006.01)
(52) U.S. Cl.
USPC ........... 429/330; 429/331; 429/332; 429/333; 429/339; 429/340; 429/199; 429/200; 429/231.1; 429/231.8; 252/62.2
(58) Field of Classification Search
USPC ......... 429/330, 331, 332, 333, 339, 340, 199, 429/200, 231.1, 231.8; 252/62.2
See application file for complete search history.

(56) References Cited

U.S. PATENT DOCUMENTS

| 2003/0054259 | A1 | 3/2003 | Murai et al. |
| 2006/0228626 | A1 | 10/2006 | Kawashima et al. |
| 2008/0248397 | A1 | 10/2008 | Jung et al. |
| 2009/0226808 | A1 | 9/2009 | Hiwara et al. |
| 2009/0253045 | A1 | 10/2009 | Kotato et al. |
| 2012/0115042 | A1 | 5/2012 | Kotato et al. |

FOREIGN PATENT DOCUMENTS

| JP | 2003-151623 A | | 5/2003 |
| JP | 2007-128765 A | | 5/2007 |
| JP | 2008-10414 A | | 1/2008 |
| KR | 10-2006-0107410 A | | 10/2006 |
| KR | 10-2006-0114919 A | | 11/2006 |
| KR | 10-0814827 B1 | | 3/2008 |
| KR | 10-2009-0039196 | * | 4/2009 |
| WO | WO 2007/043624 A1 | | 4/2007 |
| WO | WO 2007/094625 A1 | | 8/2007 |
| WO | WO 2007/142121 A1 | | 12/2007 |
| WO | WO 2009/038358 | * | 3/2009 |

OTHER PUBLICATIONS

International Search Report dated Dec. 7, 2009 for PCT/KR2009/002167.

* cited by examiner

*Primary Examiner* — Laura Weiner
(74) *Attorney, Agent, or Firm* — Birch, Stewart, Kolasch & Birch, LLP

(57) ABSTRACT

A non-aqueous electrolyte solution for a lithium secondary battery includes a lithium salt and an organic solvent. Based on 100 parts by weight of the non-aqueous electrolyte solution, the non-aqueous electrolyte solution includes 1 to 5 parts by weight of sultone compound having a carbon-carbon unsaturated bond in a cyclic structure; 1 to 5 parts by weight of cyclic carbonate compound with a vinyl group; 5 to 10 parts by weight of cyclic carbonate compound that is substituted with halogen; and 1 to 5 parts by weight of dinitrile compound. This non-aqueous electrolyte solution improves stability of a SEI film formed on a surface of an anode of a lithium secondary battery and thus improves normal temperature cycle performance and high temperature cycle performance.

8 Claims, 1 Drawing Sheet

NON-AQUEOUS ELECTROLYTE SOLUTION FOR LITHIUM SECONDARY BATTERY AND LITHIUM SECONDARY BATTERY HAVING THE SAME

BACKGROUND OF THE INVENTION

1. Technical Field

The present invention relates to a non-aqueous electrolyte solution for a lithium secondary battery, and a lithium secondary battery having the same. More particularly, the present invention relates to a non-aqueous electrolyte with excellent cycle performance and overcharging stability, and a lithium secondary battery having the same.

2. Background Art

With recent and rapid developments of information communication industries, electronic devices have become smaller, lighter, slimmer and more portable. As a result, a demand for batteries having higher energy density as a driving power source of an electronic device is increased. Among such batteries, lithium secondary batteries satisfy this demand, and numerous studies towards improvements are now in progress actively. A lithium secondary battery includes a cathode, an anode, an electrolyte and a separator that provides a passage for lithium ions moving between the cathode and the anode. When lithium ions are intercalated into or disintercalated from the cathode or the anode, the lithium ion secondary batteries generate electric energy by means of a redox reaction.

A non-aqueous electrolyte used for lithium secondary batteries generally includes an electrolyte solvent and an electrolyte salt. However, the electrolyte solvent is decomposed on an electrode surface or co-intercalated between carbonaceous anode layers while a battery is charged or discharged, thereby collapsing the anode structure. It may damage stability of the battery.

It is known that such problems may be solved by means of a SEI (Solid Electrolyte Interface) film formed on a surface of an anode by means of reduction of the electrolyte solvent when a battery is initially charged. However, the SEI film generally insufficiently serves as a film for continuously protecting the anode, and its life and performance are deteriorated as the battery repeats charging/discharging. In particular, a conventional SEI film for a lithium secondary battery is thermally unstable. Thus, in case a battery is operated or left alone under a high temperature, the SEI film may be easily collapsed due to electrochemical energy and thermal energy increased as time goes. Thus, the battery performance is more deteriorated under a high temperature. In particular, gas such as $CO_2$ is continuously generated due to collapse of the SEI film and decomposition of the electrolyte, which increases inner pressure and thickness of the battery.

In addition, cyclohexylbenzene and biphenyl were frequently used as an overcharging inhibitor. However, cyclohexylbenzene and biphenyl become factors of decreasing battery capacity and deteriorating normal temperature performance though it prevents overcharging.

In order to solve the above problems, Japanese Laid-open Patent Publication No. 1996-45545 discloses a method of using vinylene carbonate (VC) as an electrolyte additive for forming a SEI film on a surface of an anode. However, VC is easily decomposed to generate gas at a cathode on the condition of high temperature cycle or high temperature preservation, which deteriorates performance and stability of a battery.

Also, Japanese Laid-open Patent Publication No. 2002-329528 suggests controlling gas generation at a high temperature by using an unsaturated sultone compound. In addition, Japanese Laid-open Patent Publication No. 2001-006729 suggests improving high temperature preservation characteristics by using a carbonate-based compound including a vinyl group. However, these methods does not ensure a firm SEI film, so the conventional problems still remain unsolved.

DISCLOSURE

Technical Problem

The present invention is designed to solve the above problems of the prior art, and therefore it is an objective of the present invention to provide a non-aqueous electrolyte solution for a lithium secondary battery, which may improve stability of a solid electrolyte interface film formed on a surface of an anode and prevent elution of transition metal at a cathode together with maintaining overcharging stability of a lithium secondary battery, thereby allowing improvement of normal temperature cycle performance and high temperature cycle performance of the battery.

Technical Solution

In order to accomplish the above objective, the present invention provides a non-aqueous electrolyte solution for a lithium secondary battery, which includes a lithium salt and an organic solvent, wherein, based on 100 parts by weight of the non-aqueous electrolyte solution, the non-aqueous electrolyte solution includes 1 to 5 parts by weight of sultone compound having a carbon-carbon unsaturated bond in a cyclic structure; 1 to 5 parts by weight of cyclic carbonate compound with a vinyl group; 5 to 10 parts by weight of cyclic carbonate compound that is substituted with halogen; and 1 to 5 parts by weight of dinitrile compound.

The non-aqueous electrolyte solution for a lithium secondary battery according to the present invention includes a sultone compound having a carbon-carbon unsaturated bond in a cyclic structure, a cyclic carbonate compound with a vinyl group, a cyclic compound substituted with halogen and a dinitrile compound as additives in specific contents to give a remarkable synergic effect more than expected by those having ordinary skill in the art. In other words, the non-aqueous electrolyte solution of the present invention ensures more excellently stable SEI film than conventional non-aqueous electrolyte solutions for lithium secondary batteries, thereby improving cycle performance of a battery.

In the non-aqueous electrolyte solution for a lithium secondary battery according to the present invention, the sultone compound having a carbon-carbon unsaturated bond in a cyclic structure may be any one selected from the group consisting of compounds expressed in the following Chemical Formula 1 or their mixtures, but not limitedly.

Chemical Formula 1

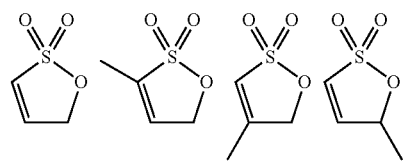

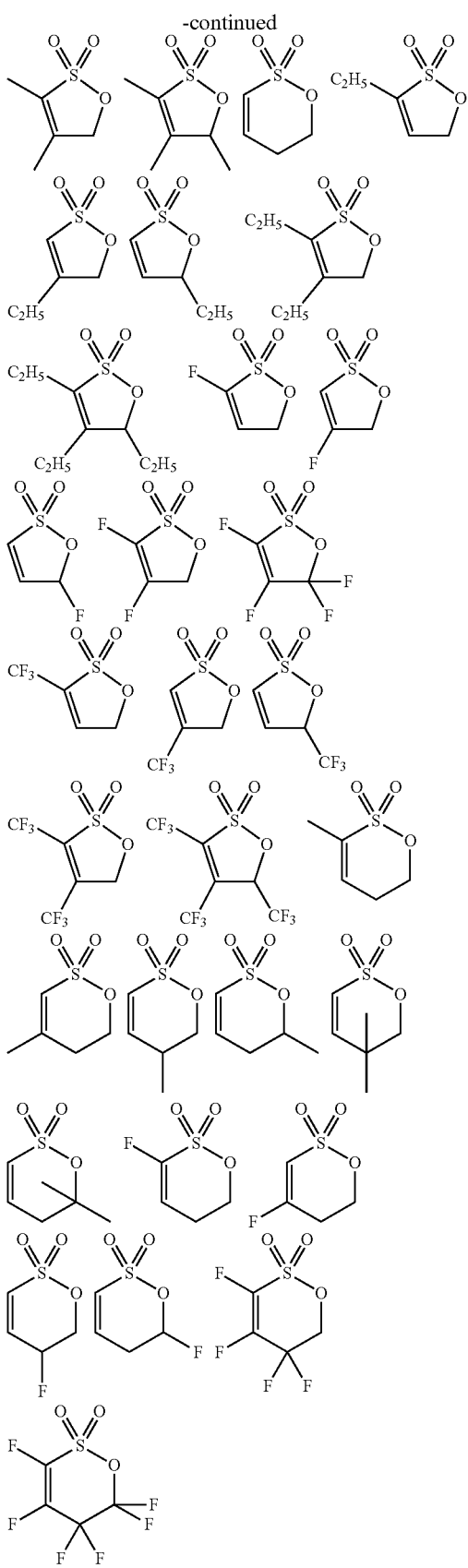

the cyclic carbonate compound with a vinyl group may be any one selected from the group consisting of 4-ethenyl-1,3-dioxolane-2-on (vinylethylene carbonate), 4-ethenyl-4-methyl-1,3-dioxolane-2-on, 4-ethenyl-4-ethyl-1,3-dioxolane-2-on, 4-ethenyl-4-n-propyl-1,3-dioxolane-2-on, 4-ethenyl-5-methyl-1,3,-dioxolane-2-on, 4-ethenyl-5-ethyl-1,3-dioxolane-2-on and 4-ethenyl-5-n-propyl-1,3-dioxolane-2-on, or their mixtures, but not limitedly.

In addition, in the non-aqueous electrolyte solution for a lithium secondary battery according to the present invention, the cyclic carbonate compound substituted with halogen may be fluoroethylene carbonate, but not limitedly.

Also, in the non-aqueous electrolyte solution for a lithium secondary battery according to the present invention, the dinitrile compound may be a compound expressed by the following Chemistry Figure 2.

NC—R—CN    Chemistry Figure 2 where R is —$(CH_2)_n$— and n is an integer of 1 to 10.

The above non-aqueous electrolyte solution for a lithium secondary battery may be used for making a lithium secondary battery.

BEST MODE

Figure 1:
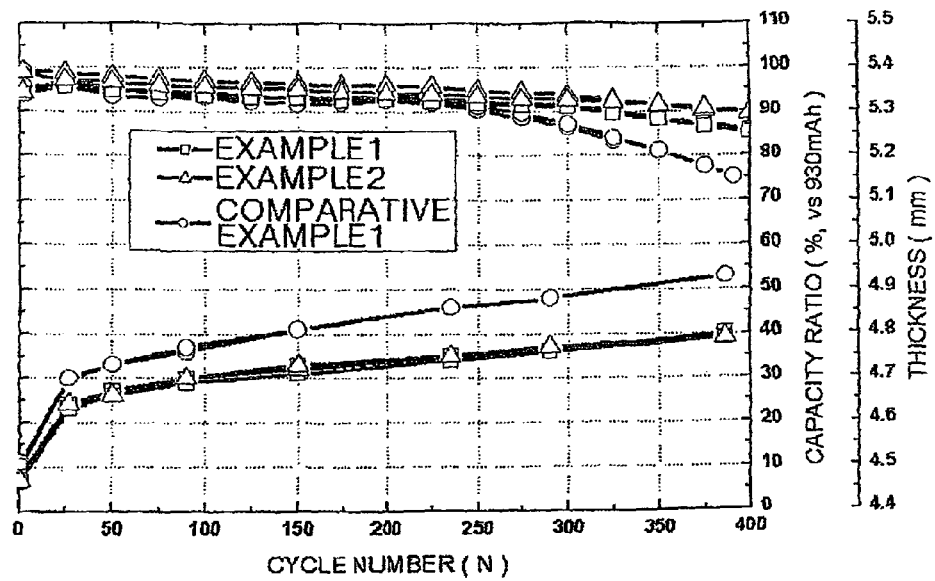
FIG. 1 is a graph showing measurement results of capacity (upper lines) and thickness (lower lines) according to charging/discharging cycles at 23° C. of lithium secondary batteries having non-aqueous electrolyte solutions according to the examples 1 and 2 and the comparative example 1.

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventors are allowed to define terms appropriately for the best explanation.

As mentioned above, a non-aqueous electrolyte solution for a lithium secondary battery generally includes a lithium salt and an organic solvent. The inventors found that, in case of a conventional lithium secondary battery containing a non-aqueous electrolyte solution using vinylene carbonate, unsaturated sultone compound or carbonate-based compound with a vinyl group, a SEI film formed on a surface of an anode is porous but not dense, so the SEI film is easily collapsed while repeating charging/discharging processes, thereby deteriorating the battery performance.

Thus, in order to solve this problem, a non-aqueous electrolyte solution for a lithium secondary battery according to the present invention includes a sultone compound having a carbon-carbon unsaturated bond in a cyclic structure, a cyclic carbonate compound with a vinyl group, a cyclic compound substituted with halogen and a dinitrile compound as additives in specific contents to give a remarkable synergic effect, as mentioned above.

The sultone compound having a carbon-carbon unsaturated bond in a cyclic structure and the cyclic carbonate compound with a vinyl group, contained in the non-aqueous electrolyte solution of the present invention, may be electrically reduced more rapidly than an electrolyte solvent and also cross- and/or repeat-polymerized to form a firmer SEI film. In this process, the SEI film formed on the surface of the anode is firm and dense and thus it is not easily collapsed though charging/discharging is repeated, thereby enhancing the life of battery and preventing decrease of capacity.

The sultone compound having a carbon-carbon unsaturated bond in a cyclic structure may control gas generation at high temperature. Preferably, any sultone compound having a double bond in a cyclic structure may give the effect aimed by the present invention. The sultone compound having a carbon-carbon unsaturated bond in a cyclic structure, included in the non-aqueous electrolyte solution for a lithium secondary battery according to the present invention, may be any one selected from the group consisting of compounds expressed in the following Chemical Formula 1 or their mixtures, but not limited thereto.

Chemical Formula I

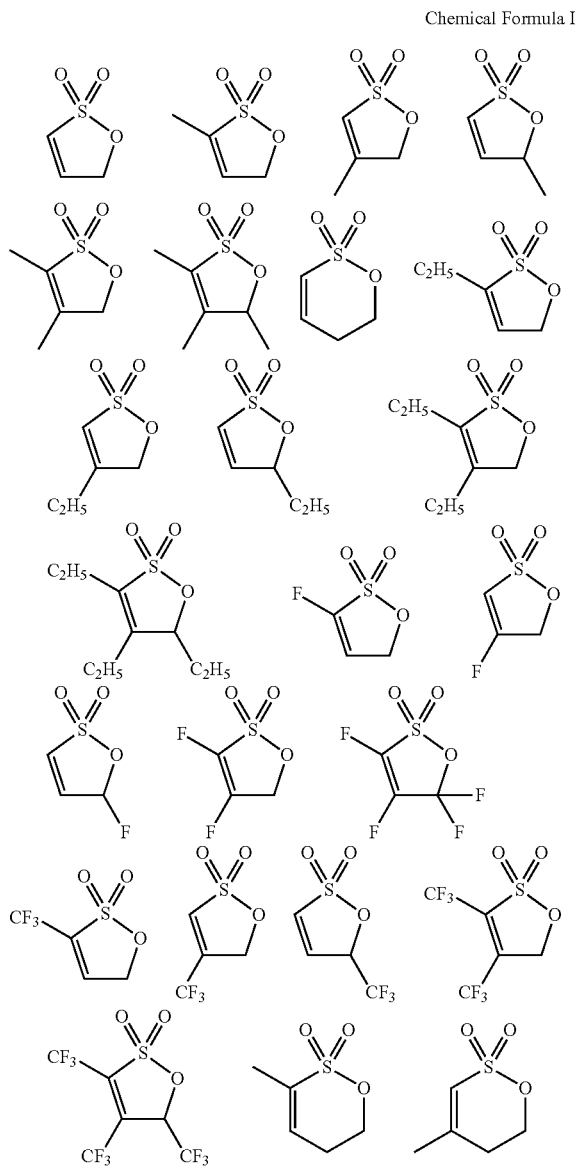

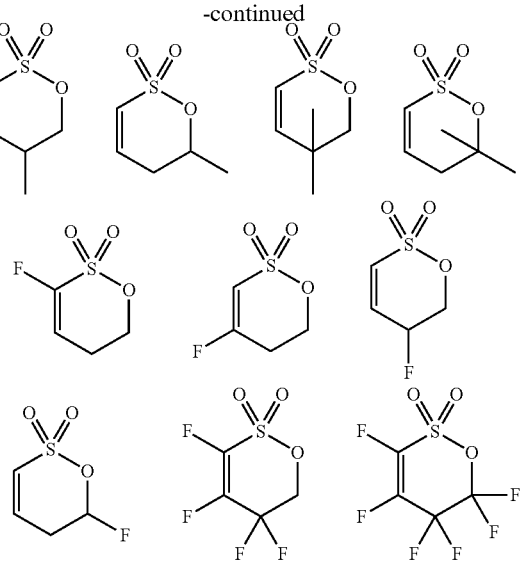

A more preferred example of the sultone compound having a carbon-carbon unsaturated bond in a cyclic structure according to the present invention may be 1,3-propene sultone, but the present invention is not limited thereto.

The non-aqueous electrolyte solution of the present invention includes 1 to 5 parts by weight of sultone compound having a carbon-carbon unsaturated bond in a cyclic structure, based on 100 parts by weight of the non-aqueous electrolyte solution. If the content of sultone compound is less than 1 part by weight, the normal and high temperature performance is deteriorated. If the content exceeds 5 parts by weight, the formed SEI rather acts as a resistance, thereby deteriorating capacity of a battery.

In addition, the cyclic carbonate compound with a vinyl group employed in the present invention has excellent high temperature preservation characteristics. In the cyclic carbonate compound with a vinyl group according to the present invention, cyclic carbonate has no special limitation, but ethylene carbonate or propylene carbonate may be preferably used. Accordingly, the cyclic carbonate compound with a vinyl group according to the present invention may be is any one selected from the group consisting of 4-ethenyl-1,3-dioxolane-2-on (vinylethylene carbonate), 4-ethenyl-4-methyl-1,3-dioxolane-2-on, 4-ethenyl-4-ethyl-1,3-dioxolane-2-on, 4-ethenyl-4-n-propyl-1,3-dioxolane-2-on, 4-ethenyl-5-methyl-1,3,-dioxolane-2-on, 4-ethenyl-5-ethyl-1,3-dioxolane-2-on and 4-ethenyl-5-n-propyl-1,3-dioxolane-2-on, or their mixtures, but not limitedly.

The non-aqueous electrolyte solution of the present invention includes 1 to 5 parts by weight of cyclic carbonate compound with a vinyl group, based on 100 parts by weight of the non-aqueous electrolyte solution. If the content of sultone compound is less than 1 part by weight, the normal or high temperature performance is deteriorated. If the content exceeds 5 parts by weight, reaction with a cathode is increased, thereby increasing a cell thickness.

In the non-aqueous electrolyte solution for a lithium secondary battery according to the present invention, the cyclic carbonate compound substituted with halogen may prevent swelling of a battery. Any compound of which cyclic carbonate is substituted with halogen may be used in the present invention without limitation. Here, cyclic carbonate has no special limitation, but ethylene carbonate or propylene carbonate may be preferably used. Accordingly, the cyclic carbonate compound substituted with halogen may be fluoroethylene carbonate, but not limitedly.

The non-aqueous electrolyte solution of the present invention includes 5 to 10 parts by weight of cyclic carbonate compound substituted with halogen, based on 100 parts by weight of the non-aqueous electrolyte solution. If the content of the compound is less than 5 part by weight, the performance of controlling swelling of a battery is deteriorated, thereby causing deterioration of thermal stability and life performance of the battery. If the content exceeds 10 parts by weight, the capacity of a battery is deteriorated.

In addition, the dinitrile compound employed in the present invention forms a complex as a nitrile group existing in the compound and having a strong polarity is strongly combined with a surface of a cathode. The formed complex serves as a protective film for isolating an active site of the surface of the cathode, which may prevent transition metal from being eluted and educed at an anode. Also, the complex controls side reaction or gas generation occurring between the electrolyte and the cathode, thereby improving high temperature characteristics.

The dinitrile compound employed in the present invention may adopt any compound with a dinitrile group. For example, the dinitrile group according to the present invention may be expressed by the following Chemistry Figure 2.

Figure 2:
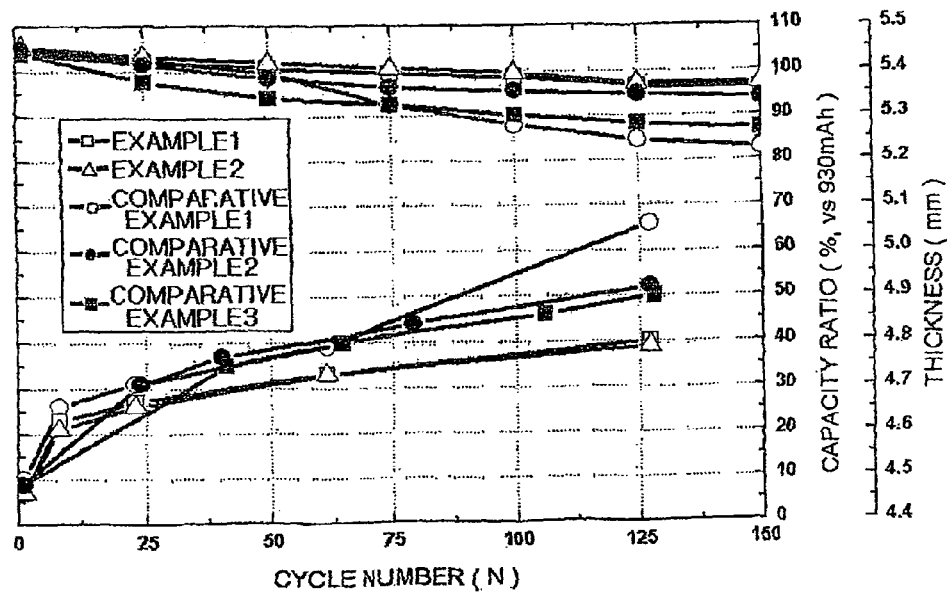
FIG. 2 is a graph showing measurement results of capacity (upper lines) and thickness (lower lines) according to charging/discharging cycles at 45° C. of lithium secondary batteries having non-aqueous electrolyte solutions according to the examples 1 and 2 and the comparative examples 1 to 3.

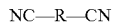   Chemistry Figure 2 where R may be $-(CH_2)_n-$ and n may be an integer of 1 to 10.

The non-aqueous electrolyte solution according to the present invention includes 1 to 5 parts by weight of dinitrile compound. If the content of dinitrile compound is less than 1 part by weight, high temperature life performance and stability are deteriorated. If the content exceeds 5 parts by weight, side reaction with a cathode is increased to increase gas generation, thereby increasing a cell thickness.

As the lithium salt incorporated in the non-aqueous electrolyte solution of the present invention, any lithium salt material commonly used in an electrolyte solution for a lithium secondary battery may be used. The lithium salt may be any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$, or their mixtures.

The organic solvent included in the non-aqueous electrolyte solution according to the present invention may use any one commonly used in electrolyte solutions for lithium secondary batteries. Representatively, the organic solvent may use any one selected from the group consisting of propylene carbonate, ethylene carbonate, diethyl carbonate, dimethyl carbonate, ethylmethyl carbonate, dipropyl carbonate, dimethyl sulfoxide, acetonitrile, dimethoxyethane, diethoxyethane, vinylene carbonate, sulfolane, γ-butyrolactone, ethylene sulfite, propylene sulfite and tetrahydrofuran, or their mixtures. In particular, among the carbonate-based organic solvents, cyclic carbonates such as ethylene carbonate and propylene carbonate are high viscosity organic solvents with high dielectric constant, which easily dissociate lithium salts in an electrolyte, desirably. If linear carbonate with as dimethyl carbonate and diethyl carbonate with low viscosity and low dielectric constant is used in mixture with such cyclic carbonate at a suitable ratio, it is possible to make an electrolyte solution with high electric conductivity, more preferably.

The non-aqueous electrolyte solution for a lithium secondary battery according to the present invention is injected into an electrode structure having a cathode, an anode and a separator interposed between the cathode and the anode, thereby making a lithium secondary battery. The cathode, the anode and the separator used in the electrode structure may be formed from any kind of material commonly used in making a lithium ion secondary battery.

More specifically, a cathode active material may preferably be a lithium-containing transition metal oxide, for example, any one material or a mixture of at least two materials selected from the group consisting of $LiCoO_2$, $LiNiO_2$, $LiMnO_2$, $LiMn_2O_4$, $Li(Ni_aCo_bMn_c)O_2(0<a<1, 0<b<1, 0<c<1, a+b+c=1)$, $LiNi_{1-y}Co_yO_2$, $LiCo_{1-y}Mn_yO_2$, $LiNi_{1-y}Mn_yO_2(0 \leq y<1)$, $Li(Ni_aCo_bMn_c)O_4(0<a<2, 0<b<2, 0<c<2, a+b+c=2)$, $LiMn_{2-z}Ni_zO_4$, $LiMn_{2-z}Co_zO_4(0<z<2)$, $LiCoPO_4$ and $LiFePO_4$. Also, sulfide, selenide and halide may be used in addition to the above oxides.

An anode active material may be formed from carbon material, lithium metal, silicon or tin, into/from which lithium ions may be intercalated or disintercalated. Among them, carbon material is preferred. The carbon material may be low-crystalline carbon or high-crystalline carbon. The low-crystalline carbon may be soft carbon or hard carbon as representative examples, and the high-crystalline carbon may be natural graphite, Kish graphite, pyrolytic carbon, mesophase pitch based carbon fiber, meso-carbon microbeads, mesophase pitches, or high-temperature sintered carbon, such as petroleum or coal tar pitch derived cokes, as representative examples. The anode may contain a binding agent, which may employ various kinds of binder polymers, such as PVDF-co-HFP, polyvinylidenefluoride, polyacrylonitrile, and polymethylmethacrylate.

In addition, the separator may be formed of common porous polymer films used as a conventional separator, such as porous polymer film made using ethylene homopolymer, propylene homopolymer, ethylene/butene copolymer, ethylene/hexene copolymer or ethylene/methacrylate copolymer, in a single layer or in laminate form. In other cases, the separator may be formed of a common porous non-woven fabric such as a non-woven fabric made of glass fiber with a high melting point or polyethylene terephthalate fiber, but it is not limited thereto.

The lithium secondary battery of the present invention may have a variety of shapes which are not specially limited. Examples include a cylindrical can shape, an angled shape, a pouch shape or a coin shape.

MODE FOR INVENTION

Hereinafter, various preferred examples will be described in detail to illustrate the present invention. However, the examples of the present invention may be modified in various ways, and they should not be interpreted as limiting the scope of the invention. The examples of the present invention are presented only for a better understanding of the invention to persons having ordinary skill in the art.

Example 1

$LiPF_6$ was added to a solution in which ethylene carbonate (EC), diethyl carbonate (DEC) and propylene carbonate (PC) were mixed in a volume ratio of 2:7:1 to make a 1M $LiPF_6$ solution. Then, 1 part by weight of 1,3-propene sultone (PRS), 1 part by weight of vinylethylene carbonate (VEC), 5.38 parts by weight of fluoroethylene carbonate (FEC) and 1 part by weight of succinonitrile (SN) were added based on 100 parts by weight of non-aqueous electrolyte, thereby preparing a non-aqueous electrolyte solution.

Example 2

A non-aqueous electrolyte solution was prepared in the same way as in the Example 1, except that a 1:1 mixture of diethyl carbonate and ethylmethyl carbonate was used instead of diethyl carbonate.

Comparative Example 1

$LiPF_6$ was added to a solution in which ethylene carbonate (EC), diethyl carbonate (DEC) and propylene carbonate (PC) were mixed at a volume ratio of 2:7:1 to prepare 1M $LiPF_6$ solution as a non-aqueous electrolyte solution.

Comparative Example 2

A non-aqueous electrolyte solution was prepared in the same way as in the Example 1, except that succinonitrile was not used.

Comparative Example 3

A non-aqueous electrolyte solution was prepared in the same way as in the Example 1, except that 1,3-1(propene)sultone (PRS) was not used.

Measurement of Cycle Performance

Cylindrical lithium secondary batteries including the non-aqueous electrolyte solutions prepared according to the Examples 1 and 2 and the Comparative Examples 1 to 3 were manufactured using $LiCoO_2$ as a cathode and artificial graphite as an anode. The manufactured batteries were charged and discharged 400 times at 23° C. and 45° C., and then their changed capacity and changed thickness in comparison to initial values were measured. The measured data for changed capacity and changed thickness at 23° C. are shown in a graph of FIG. 1, and the measured data at 45° C. are shown in a graph of FIG. 2.

As seen from FIGS. 1 and 2, it would be understood that the batteries having the non-aqueous electrolyte solutions according to the present invention maintains capacity preserving performance and thickness changing rate excellently as cycles are increased.

The invention claimed is:
1. A non-aqueous electrolyte solution for a lithium secondary battery, which includes a lithium salt and an organic solvent, wherein, based on 100 parts by weight of the non-aqueous electrolyte solution, the non-aqueous electrolyte solution comprises:
    1 to 5 parts by weight of sultone compound having a carbon-carbon unsaturated bond in a cyclic structure;
    1 to 5 parts by weight of cyclic carbonate compound with a vinyl group;
    5 to 10 parts by weight of fluoroethylene carbonate; and
    1 to 5 parts by weight of dinitrile compound.
2. The non-aqueous electrolyte solution for a lithium secondary battery according to claim 1,
    wherein the sultone-based compound having a carbon-carbon unsaturated bond in a cyclic structure is any one selected from the group consisting of compounds expressed in the following Chemical Formulae 1 to 34 or their mixtures:

-continued
Chemical Formula 10
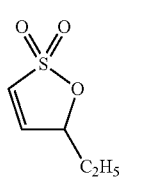
Chemical Formula 11
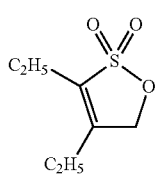
Chemical Formula 12
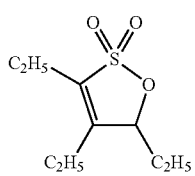
Chemical Formula 13
Chemical Formula 14
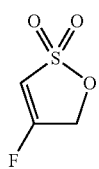
Chemical Formula 15
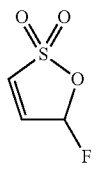
Chemical Formula 16
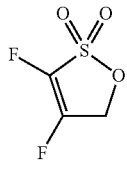
Chemical Formula 17
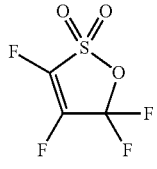
Chemical Formula 18
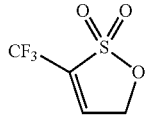
-continued
Chemical Formula 19
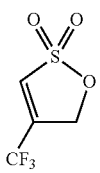
Chemical Formula 20
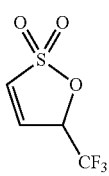
Chemical Formula 21
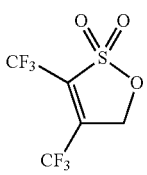
Chemical Formula 22
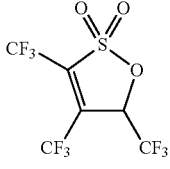
Chemical Formula 23
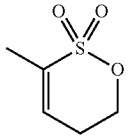
Chemical Formula 24
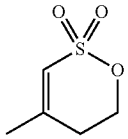
Chemical Formula 25
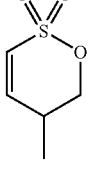
Chemical Formula 26
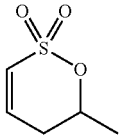
Chemical Formula 27
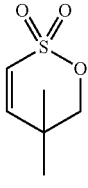

Chemical Formula 28

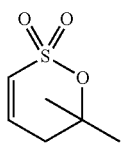

Chemical Formula 29

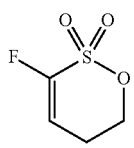

Chemical Formula 30

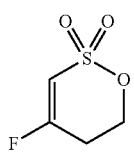

Chemical Formula 31

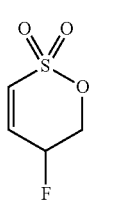

Chemical Formula 32

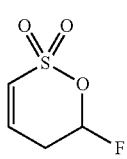

Chemical Formula 33

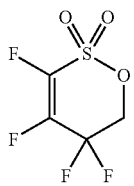

Chemical Formula 34

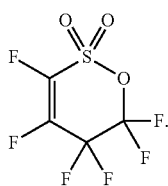

3. The non-aqueous electrolyte solution for a lithium secondary battery according to claim 2, wherein the sultone compound having a carbon-carbon unsaturated bond in a cyclic structure is 1,3-propene sultone expressed in Chemical Formula 1.

4. The non-aqueous electrolyte solution for a lithium secondary battery according to claim 1, wherein the cyclic carbonate compound with a vinyl group is any one selected from the group consisting of 4-ethenyl-1,3-dioxolane-2-on, 4-ethenyl-4-methyl-1,3-dioxolane-2-on, 4-ethenyl-4-ethyl-1,3-dioxolane-2-on, 4-ethenyl-4-n-propyl-1,3-dioxolane-2-on, 4-ethenyl-5-methyl-1,3,-dioxolane-2-on, 4-ethenyl-5-ethyl-1,3-dioxolane-2-on and 4-ethenyl-5-n-propyl-1,3-dioxolane-2-on, or their mixtures.

5. The non-aqueous electrolyte solution for a lithium secondary battery according to claim 1, wherein the dinitrile compound is a compound expressed by the following Chemistry Figure 2:

NC—R—CN  Chemistry Figure 2 where R is $-(CH_2)_n-$ and n is an integer of 1 to 10.

6. The non-aqueous electrolyte solution for a lithium secondary battery according to claim 1, wherein the lithium salt is any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$, or their mixtures.

7. The non-aqueous electrolyte solution for a lithium secondary battery according to claim 1, wherein the organic solvent is any one selected from the group consisting of propylene carbonate, ethylene carbonate, diethyl carbonate, dimethyl carbonate, ethylmethyl carbonate, dipropyl carbonate, dimethyl sulfoxide, acetonitrile, dimethoxyethane, diethoxyethane, vinylene carbonate, sulfolane, γ-butyrolactone, ethylene sulfite, propylene sulfite and tetrahydrofuran, or their mixtures.

8. A lithium secondary battery, which includes a cathode made of lithium-containing oxide, an anode made of carbonaceous material capable of absorbing/desorbing lithium ions, and a non-aqueous electrolyte solution, wherein the non-aqueous electrolyte solution is a non-aqueous electrolyte solution defined in claim 1.

* * * * *